United States Patent [19]

Lippel

[11] Patent Number: 4,460,924
[45] Date of Patent: * Jul. 17, 1984

[54] DITHER QUANTIZED SIGNALLING FOR COLOR TELEVISION

[75] Inventor: Bernard Lippel, West Long Branch, N.J.

[73] Assignee: Quanticon Inc., West Long Branch, N.J.

[*] Notice: The portion of the term of this patent subsequent to Jun. 23, 1998 has been disclaimed.

[21] Appl. No.: 224,679

[22] Filed: Jan. 13, 1981

Related U.S. Application Data

[63] Continuation of Ser. No. 897,860, Apr. 19, 1978, Pat. No. 4,275,411.

[51] Int. Cl.³ .................. H04N 9/32; H04N 9/493
[52] U.S. Cl. ............................ 358/310; 358/13
[58] Field of Search ............ 358/12, 13, 138, 30, 358/15, 16, 39, 141, 133, 8, 5, 4, 11, 310; 360/32, 33

[56] References Cited

U.S. PATENT DOCUMENTS

| | | | |
|---|---|---|---|
| 3,382,317 | 5/1968 | Sandler | 358/30 |
| 3,739,082 | 7/1973 | Lippel | 358/138 |
| 3,858,240 | 12/1974 | Golding | 358/13 |
| 4,015,286 | 3/1977 | Russell | 358/13 |
| 4,107,729 | 8/1978 | Otobe et al. | 358/323 |
| 4,275,411 | 6/1981 | Lippel | 358/13 |

OTHER PUBLICATIONS

Patchett, *Color Television with Particular Reference to the PAL System*, 1968, Norman Price Publishers, pp. 115, 116.

*Primary Examiner*—John C. Martin

[57] ABSTRACT

One or more of the video components of prior art are quantized coarsely before being sent to a receiver. To prevent perceptible loss of picture information and to minimize visible artifacts, suitable ordered dither is added before a component is quantized. The transmitted signal is preferably also sampled at the transmitter and resampled and requantized in the receiver for combatting noise and distortion. Some forms of the invention are compatible with prior art receivers. Other forms provide compressed digital signalling and coarsely quantized pulse-amplitude modulation.

45 Claims, 9 Drawing Figures

FIG. 9E

DITHER QUANTIZED SIGNALLING FOR COLOR TELEVISION

This is a continuation of application Ser. No. 897,860, filed Apr. 19, 1978, now U.S. Pat. No. 4,775,411.

SUMMARY

This invention concerns the sending and reproduction of colored television pictures. In television transmitters of the prior art, input devices (including color camera and matrix unit) generate component video signals which are substantially replicated in associated receivers. Output devices (including matrix unit and display) of a prior-art receiver convert said replicated components into a displayed picture. My invention utilizes the transmitter-input of the prior art and the receiver-output of the prior art, but alters at least one of the component video signals sent from the transmitter and replicated in the receiver. This is done in a manner which does not appreciably impair the quality of the perceived picture but facilitates substantially exact replication of signals and has other advantages.

Specifically, one or more of the video components generated by prior-art devices are coarsely quantized before being sent to a receiver. Such coarsely quantized signals can usually be requantized after reception to remove effects of noise and distortion in the communications channel. However, to prevent the loss of perceptible picture information in consequence of coarse quantization of the signal amplitude, and to minimize visible artifacts, suitable ordered dither is first added to a signal before it is quantized. The transmitted signal is preferably also sampled at fixed rate and may also be resampled in the receiver for further aid in restoration.

A black-and-white picture transmitted by dithered and coarsely quantized signalling of the prior art is reproduced having a stippled structure, such that a shade of gray intermediate between quantum signal levels is approximated by means of a mixture of dots, some lighter and some darker than the required shade. In a monochrome television system, my U.S. Pat. No. 3,739,082, entitled "Ordered Dither System" and assigned to the U.S. of America, teaches the use of suitably designed 3-dimensional dithers to reduce the visibility of such stippling. According to the present invention, I quantize with dither one or more of the component video signals of color television, and this results in a pointillistically colored display wherein differently colored specks or patches are intermingled and give the subjective effect of intermediate colors or shades. Furthermore, I may employ 3-dimensional dithers to minimize the visibility of the specks or patches.

Some forms of my invention are compatible with television transmitters or receivers of the prior art without, however, realizing all of the benefits of the invention when used in that manner. Other forms provide binary digital signalling between transmitter and receiver, and still other forms signal by means of composite sampling pulses. Binary signalling is accomplished with appreciably less channel capacity than comparable PCM transmission.

OBJECTS OF THE INVENTION

One object of the invention is to transmit a color television picture having better quality than has heretofore been possible in relation to the communications channel and equipment complexity.

Another object of the invention is to combat effects of noise and distortion introduced in a color television channel.

Another object of the invention is to overcome effects of noise and distortion introduced by video recording equipment for color pictures.

Another object of the invention is to achieve the above objects in equipment which is also compatible with prior-art transmitters and receivers.

A further object of the invention is to transmit color television pictures by means of compressed binary signalling, using relatively simple and economical apparatus.

A further object of the invention is to transmit high quality color television pictures by means of M-ary digital signalling, using a substantially conventional analog channel and a relatively small value of M.

EXPLANATIONS AND REFERENCES

The expressions "communication channel" and "transmission channel" are used herein to refer to both direct channels (such as radio or wire links) and means for recording and later reproduction. Likewise, "transmitter" may refer to a video recording device and "receiver" to the associated playback equipment.

"Ordered-dither coding" or "dither quantizing" or simply "dither coding" refers to coarse quantization of signal amplitudes subsequent to the addition of ordered dither to the signal. Ordered-dither coding of a monochrome television signal is disclosed in my U.S. Pat. No. 3,739,082, entitled "Ordered Dither System", with special reference to 3-dimensional ordered dither and nasik dither patterns. Although this kind of ordered dither is not essential for the present invention, I generally prefer it, especially in conjunction with conventionally interlaced television scanning.

Briefly, a 2-dimensional ordered dither pattern has a rectangular array of dither samples repeated horizontally and vertically over the entire television scanning raster, and a three-dimensional dither pattern also changes between successive frames of the televised moving picture.

There are a number of literature descriptions of 2-dimensional ordered dither patterns including Lippel and Kurland, "The Effect of Dither on Luminance Quantization of Pictures", *IEEE Trans. Comm. Technol.* COM-19, no. 6 (December 1971) and Bayer "An Optimum Method for Two-Level Rendition of Continuous Tone Pictures", *Int. Conf. on Commun.*, Conf. Record, pp. 26-11 to 26-15, 1973. A specific kind of 2-dimensional ordered dither is also described in U.S. Pat. No. 3,997,719, entitled "Bi-Level Display Systems" and issued to Judice. Three-dimensional ordered dither is also described in my article "Two-and Three-Dimensional Ordered Dither in Bi-Level Picture Displays". *Proc. of the S.I.D.*, vol. 17/2, 2nd Quarter 1967. (Although the last three references are principally concerned with 2-level quantization, dither patterns are the same with a larger number of levels.)

When necessary or advisable, the invention will be described in terms of the NTSC color system (standard in the United States) and the Y (luminance) and I and Q (chrominance) components of said system. It will, however, be clear to persons skilled in the art how the principles of the invention apply equally to other systems such as PAL and SECAM (which are conventional in other countries) and also to recording and playback systems.

Figure 1:
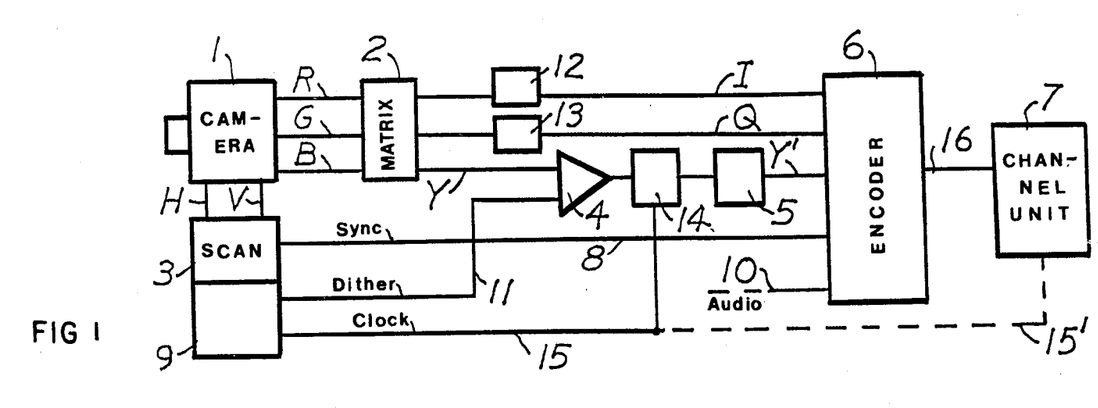
FIG. 1 shows a transmitter corresponding to an embodiment of the invention and also compatible with certain prior-art color-television receivers.
Figure 2:
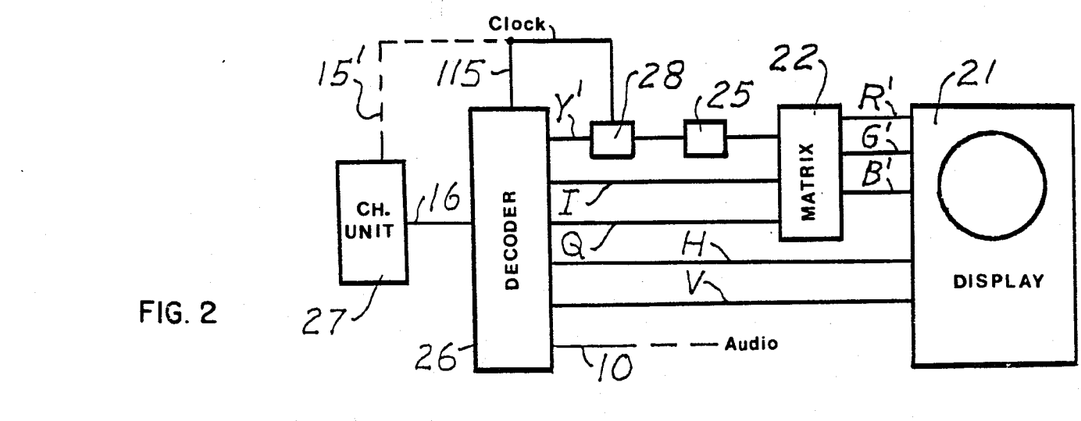
FIG. 2 shows the corresponding receiver which is also compatible with certain prior art transmitters.

EMBODIMENT OF FIGS. 1 and 2

FIG. 1 represents the transmitter and FIG. 2 the receiver of a prior-art color television system which has been improved in accordance with one embodiment of the invention. According to only prior art, camera unit 1 of FIG. 1 generates primary-color video signals R, G and B (for red, green and blue) which are converted in matrix unit 2 into luminance signal Y and chrominance signals I and Q. Low-pass filters 12 and 13 have been included to indicate that I and Q have less bandwidth than Y. Horizontal (H) and vertical (V) scanning signals are provided by the sweep unit 3 which also provides sync signal 8 for both horizontal and vertical synchronization. In the prior art, Y, I, Q, sync 8, and an audio input 10 are all combined in encoder unit 6. The output from 6 is a composite signal 16 containing substantially all the information put into the encoder. The composite signal 16 is furnished to channel unit 7, which may be a broadcast transmitter, recording device, or the like.

Units added in accordance with this embodiment of the invention include dither generating circuits 9 attached to the sweep unit 3, summing unit 4, sampler 14, and quantizer 5. The Y signal is not furnished directly to the encoder, but to summer 4 instead, where it is added to a dither signal 11 from dither generator 9. Units 3 and 9 also furnish a clock signal 15 (assumed to be at $8 \times 10^6$ pulses per sec.) which samples the output from summing unit 4. The resulting samples are quantized into N discrete levels by quantizer unit 5. Then the stream of quantized samples, designated Y', is furnished to encoder 6 in place of the Y signal of prior art.

One suitable form of dither generator 9 is disclosed generally in my U.S. Pat. No. 3,739,082 and, furthermore, a particular arrangement suitable for use with NTSC scanning is discussed below with the aid of FIG. 7. The quantizer 5, which is not itself part of the invention, can be constructed in various wasy. It preferably has a "staircase" input-output characteristic with N steps, such as can be produced by combining outputs from N-1 diode circuits or bistable amplifiers, biased differently so that they trigger "on" at progressively higher amplitude values of a signal applied to all inputs simultaneously. The prior-art summing unit 4 and sampler 14 are so well known as to require no further discussion. The value of N in the quantizer is typically between three and eight, but two steps or more than eight are also feasible.

FIG. 2 represents a color receiver suitable for the transmitter of FIG. 1. Channel unit 27 (which may be a radiosignal receiver, a playback unit for video recordings, or the like) supplies composite signal 16 of the transmitter to prior-art decoder 26. The decoder separates out the various component signals of the composite, and H and V sweep signals are generated to produce a scanning raster in display unit 21 in synchronism with the raster of camera 1 of the transmitter; all this is according to prior art. Further in accordance with prior art, Y, I and Q components (corresponding to the output of transmitter matrix 2) would be recovered by decoder 26 and collectively converted in receiver matrix unit 22 into the primary-color video signals R', G' and B' which, in turn, produce a color picture in prior-art display unit 21. According to the instant invention embodiment, however, the dither-coded luminance signal Y', and not the original luminance signal Y, is incorporated into the composite signal and recovered (along with I and Q) by decoder 26. I prefer to resample Y' in optional resampling unit 28 substantially in synchronism with clock pulses 15 of the transmitter. According to the invention, the Y' signal is requantized in quantizer unit 25 which has steps corresponding to those of the transmitter quantizer 5. Requantization of the recovered Y' signal (preferably accompanied by resampling) removes unwanted noise and distortion which may have been added during transmission from the transmitter. The regenerated Y' signal is then furnished to matrix unit 22 together with I and Q from the decoder and the three signals are thereafter processed and displayed like the Y, I and Q signals of prior art.

If encoder 6, decoder 26, channel units 7 and 27 and the intervening communications channel all provide sufficiently generous bandwidth in the Y' channel in relation to the sampling ratio, the recovered Y' signal may have detectable pulsations (due to the sampler 14), onto which a highly stable oscillator can be locked in accordance with prior art for preferred resampling of Y' in the receiver. In the many instances, when it is not practicable to provide enough bandwidth for this purpose, other known methods can provide a suitable clock signal 115. For example, an independent clocking oscillator can be phase-locked to the horizontal sync or to a special "clock-burst" signal, similar to the "color-burst" of the NTSC system; in some cases, it may even be possible to use the color burst itself, or the color carrier, for synchronization.

An especially simple and accurate method for reclocking in the receiver is practicable when channel units 7 and 27 are recording and playback devices, viz., to record the clock signal on a separate track and to reproduce it along with the composite video. The dotted connections 15' on FIGS. 1 and 2 represent recorded clock signals and it should be understood that 15' of FIG. 2 replaces the independent clock signal 115 mentioned above. It will no doubt occur to persons skilled in the art that the same recorded clock signal can be employed to overcome effects of variations in recording and playback speed. In the particular case of disk records, only one circular track is needed for the clock signal, while the composite video signal can be recorded on a continuous spiral of much greater length.

Although FIGS. 1 and 2 show only the luminance component Y to be dither-coded, it will be evident to persons skilled in the art that either or both chrominance components can be dither coded and regenerated in similar fashion without departing from the spirit of the invention. Inasmuch as much more pictorial information is included in the luminance component than in the chrominance components, and inasmuch as the human psychovisual system is most sensitive to noise and distortion in the Y channel, quantization and regeneration of Y is more important than corresponding protection of the I and Q components. Furthermore, for communications efficiency, a chrominance signal should be dithered and sampled at lesser rate than Y, and quantized into fewer steps. This is explained more below, in connection with other embodiments of the invention.

If the transmitter of FIG. 1 corresponds to one of the prior art except for sampling and dither coding of the luminance component, a compatible prior-art receiver linked to the transmitter of FIG. 1 will display the same color picture as the receiver of FIG. 2 without, however, counteracting noise and distortion.

Figure 3:
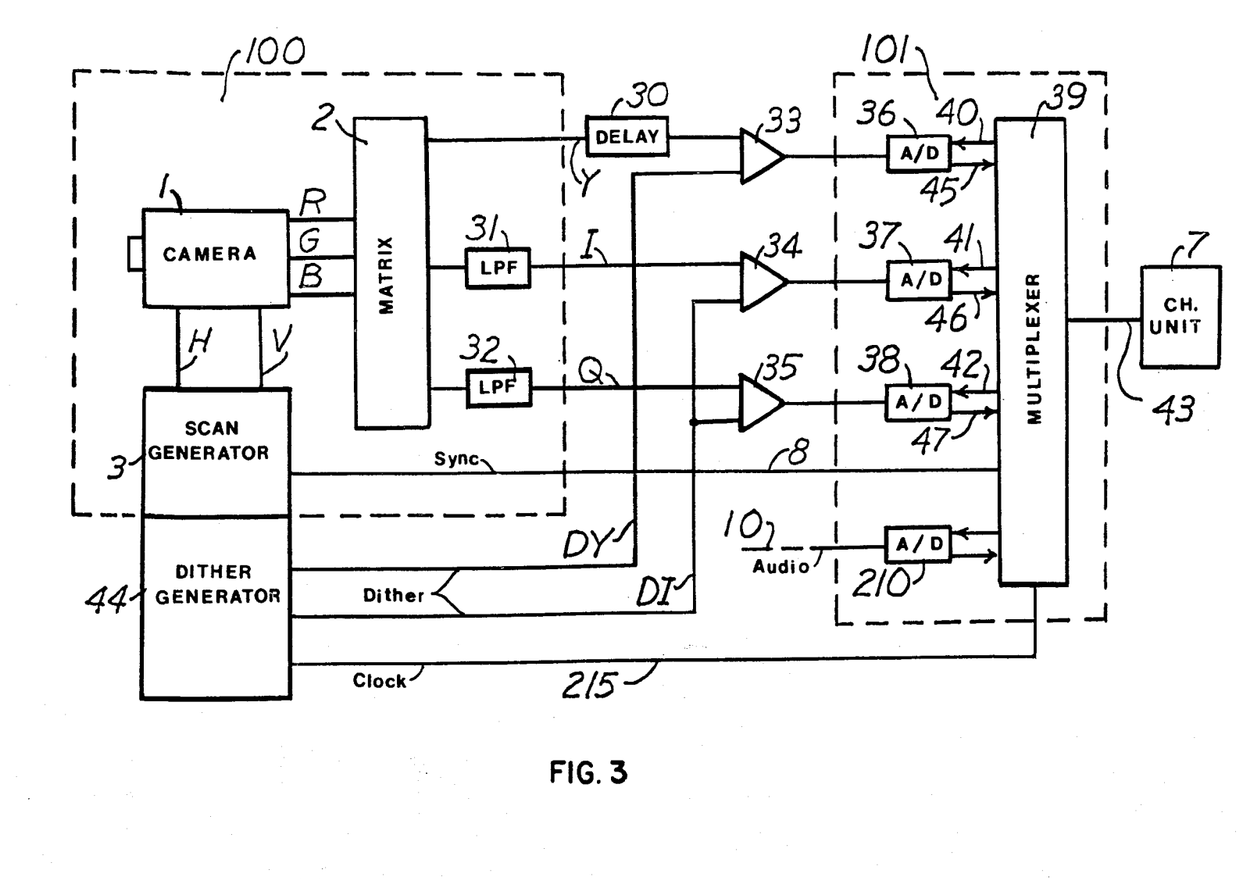
FIG. 3 shows a transmitter embodiment which sends a binary digital signal to its receiver.
Figure 4:
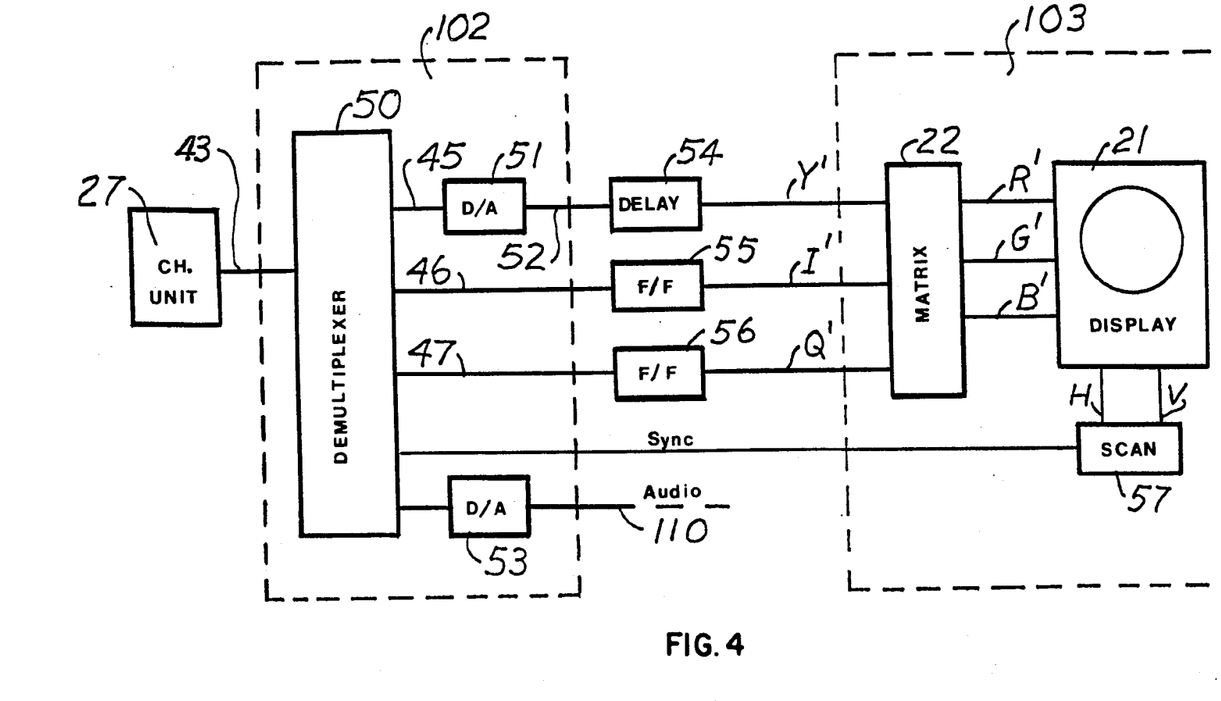
FIG. 4 is the receiver.

EMBODIMENT OF FIGS. 3 AND 4

A second general embodiment of my invention is characterized by dither coding of all video components, use of analog-to-digital converters (a/d's) to quantize in the transmitter, and multiplex transmission of the resulting binary digits (or their digital equivalents) in accordance with wellestablished prior art. A receiver demultiplexes and decodes the transmitted digital signal, to reconstruct separate luminance, chrominance and sync signals from which a priort-art display unit reconstructs the colored television picture. As a general rule, since the chrominance channels have less bandwidth, they are sampled less frequently than the luminance channel which has more bandwidth, and they are also quantized more coarsely, i.e. with fewer bits per sample. Therefore, the number of bits per second transmitting luminance is usually much greater than the number of bits per second transmitting either chrominance component.

Figure 8:
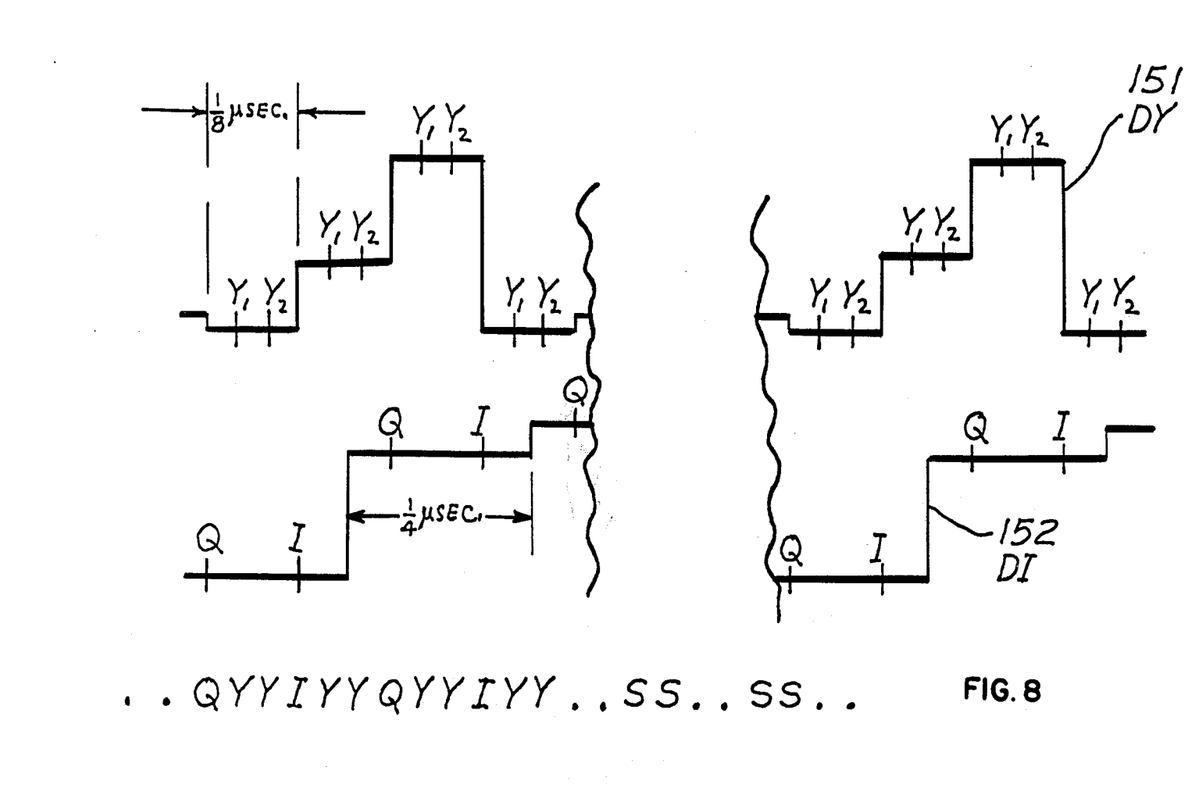
FIG. 8 shows certain ideal waveshapes associated with FIGS. 3 and 4.

FIGS. 3, 4 and 8 refer to a particular example of such general embodiment. For the system of these figures, the Y bandwidth is assumed to be 4 MHz., the I bandwidth 1.5 MHz. and the bandwidth of Q is assumed to be 0.5 MHz. Y is, therefore, sampled $8 \times 10^6$ times per second, but each of I and Q at only half that rate. Furthermore, Y is digitized with two binary digits (bits) per sample, corresponding to four quantized levels, but I and Q have only one bit per sample, corresponding to two levels.

The part of FIG. 3 enclosed in a dotted rectangle and designated 100 is merely color-input equipment of the prior art, including camera 1, raster and sync generator 3 and matrix 2 which were previously discussed in relation to FIG. 1. Low-pass filters 31 and 32 have been included to suggest the lower bandwidths of the two chrominance channels. A dither generator 44 uses signals from the raster generator 3 to generate one dither signal DY for the Y channel and, in this example, another dither signal DI which goes to both I and Q channels; with other examples, there may be a separate dither generator for each video component. Dither is generated in accordance with prior art, also discussed later herein. Clock signal 215 is assumed in this example to have a rate of $24 \times 10^6$ pulses per second and is brought out from unit 44.

Ignoring, for the present, delay unit 30, the Y output of matrix 2 is added to DY in unit 33 and their sum presented at the input of analog-to-digital converter 36 (a/d 36). Likewise, the sum of I and DI appears at the input to a/d 37 and the sum of Q and DI at the input to 38. The analog-to-digital converters 36, 37, 38 and 210 and multiplexing unit 39 are incorporated into prior-art encoder and multiplexer 101, shown enclosed within a dotted rectangle. Both 101 and the complementary demultiplexer-decoder 102 of FIG. 4 are entirely of the prior art as discussed, for example, in the book "Transmission Systems for Communications", published by Bell Telephone Laboratories (4th edition, 1970), with particular reference to Section 6.3 and Chapters 24, 25 and 26. They will, therefore, not be described in further detail.

Returning to FIG. 3, the audio signal 10 may go, if desired, to another a/d designated 210. The sync signal 8 is furnished directly to multiplexer 39. Under control of clock signal 215 and sync 8, encoder-multiplexer 101 samples the various inputs, digitizes the samples into binary form, and combines the binary outputs into a signal bit stream 43. In the present instance, since 37 and 38 are only one-bit a/d's, they are realized by means of 2-level quantizers (hard clippers) whose output is sampled by the interrogation pulses 41 and 42 to obtain 1-bit samples on leads 46 and 47 respectively. On the other hand, interrogation 40 causes a 2-bit word from a/d 36 to be sent back on lead 45.

FIG. 8 represents waveforms and sampling during scanning of part of a line of the television raster to explain details of the multiplexing. Both luminance and chrominance are assumed to be constant during the small scanning interval shown. Dither signal DY is seen to be a repeating function 151. Although DY changes in waveform from line to line and frame to frame, it is merely repeated over and over on a single scan line, as indicated, the amplitude changing $8 \times 10^6$ times per second so three clock periods occur during each fixed-amplitude interval. A/d converter 36 is interrogated once during each such interval and produces two bits which are then transmitted by the multiplexer in synchronism with the clock pulses at times labelled $Y_1$ and $Y_2$ on the waveform. Meanwhile, dither generator 44 has also put out dither signal DI, having waveform 152. The amplitude changes in 152 half as often as in 151, that is to say, once every six clock pulses. The sum I+DI is sampled $4 \times 10^6$ times a second and a single bit representing its 2-level quantized value is inserted into the bit stream 43 at a time (shown by I) corresponding to a clock pulse without a Y bit. Finally, the sum Q+DI is sampled midway between I samples and quantized with one bit, and the bit inserted in the bit stream at places marked Q. The combined effect is a stream of interleaved Y, I and Q bits, as shown at the bottom of FIG. 8 which also shows a sync message labelled SS . . . SS. It will be understood that the message SS . . . SS . . . occurs during an interval between scanning lines.

Under control of sync signal 8, encoder-multiplexer 101 ceases to interrogate unit 36, 37 and 38 during the horizontal blanking period following a line scan and transmits horizontal and vertical sync messages of the prior art during this interval. In the assumed NTSC system, the blanking intervals recur 15,750 times per second. Therefore, audio input 10, digitized by a/d 210, can, if desired, also be transmitted during the blanking intervals in accordance with prior art not part of the invention.

Channel unit 7 of FIG. 3 and channel unit 27 of FIG. 4 are of the prior art and provide bit stream 43 to demultiplexer-decoder 102 of FIG. 4, already resampled and requantized into distinct binary signals to minimize effects of noise and distortion. Unit 102 detects the snyc messages of the bit stream which then serve, in accordance with prior art, to synchronize demultiplexer 50 with multiplexer 39 of the transmitter and also to synchronize the horizontal and vertical sweeps of raster scan generator 57 with corresponding H and V sweeps of camera 1 of the transmitter. Prior-art demultiplexer-decoder 102 is enclosed by a dotted rectangle on FIG. 4. Demultiplexer 50 of unit 102 distributes separate component signals in binary form onto leads 45, 46 and 47 respectively. The 2-bit words representing Y+DY samples are decoded by digital-to-analog converter 51 (d/a 51) into 4-level pulse-amplitude-modulated (PAM) pulses which appear at the output 52. The 1-bit I+DI and Q+DI signals are arranged, in accordance with prior art, so that they also correspond to 2-level PAM samples. Lead 46 is, therefore, shown connected directly to prior-art unit 55, assumed to be a SET-RESET flip-flop arranged to store the sample output I' until a new sample appears on lead 46; likewise, lead 47 is connected to flip-flop 56 which stores output Q' in the same fashion. If necessary, d/a 53 may be used in accordance with prior art to provide an audio output 110, as indicated on the drawing. The flip-flop units insure essentially continual I' and Q' inputs to matrix unit 22 during the entire period of an active scan line. Meanwhile, a Y' input to matrix 22 is provided from d/a 51 (through delay unit 54 which will be discussed presently). Hence Y', I' and Q' component signals (which are dither-coded representations of Y, I and Q of the prior art) appear simultaneously at the inputs to matrix unit 22, a part of the prior-art output display unit 103. Y', I' and Q' are converted into equivalent primary-color components R', G' and B' and displayed as a color picture as in the prior art. Ordinarily, at least unit 103 will not have sufficient bandwidth to follow the $8 \times 10^6$ pulses per second rate of the Y' pulses and the effect will be as if Y' also were stored between samples; but even otherwise, the consequent dot pattern produced on the displayed picture would not be more serious than the horizontal scanning lines of prior art.

Storage of the I' and Q' component signals in flip-flop units 55 and 56 effectively delays them relative to Y'. Therefore, it is desirable that Y-channel compensating delays 30 of FIG. 3, 54 of FIG. 4, or both, be inserted as shown. This is in addition to other channel compensation delays which may be provided in accordance with prior art and which are preferably adjusted for best register of the R', G' and B' components of the picture ultimately displayed.

It is conventional in the art to consider that each sample of the luminance component Y defines a picture element (pel). It will be apparent to those skilled in the art, therefore, that the particular details used for description of the FIGS. 3 and 4 embodiment of my invention correspond to binary encoding of color television using 3 bits/pel and a bit rate of $24 \times 10^6$ bits per sec. It will also be apparent that, in general, any of the Y, I, and Q components could have been digitized with one or more bits (instead of exactly two for Y and one for the other component signals) and other sampling rates could also have been used, to obtain other values of bits per pel and bits per sec. in the combined signal 43 and/or different apportionment of the transmitted information among the luminance and chrominance components.

Figure 5:
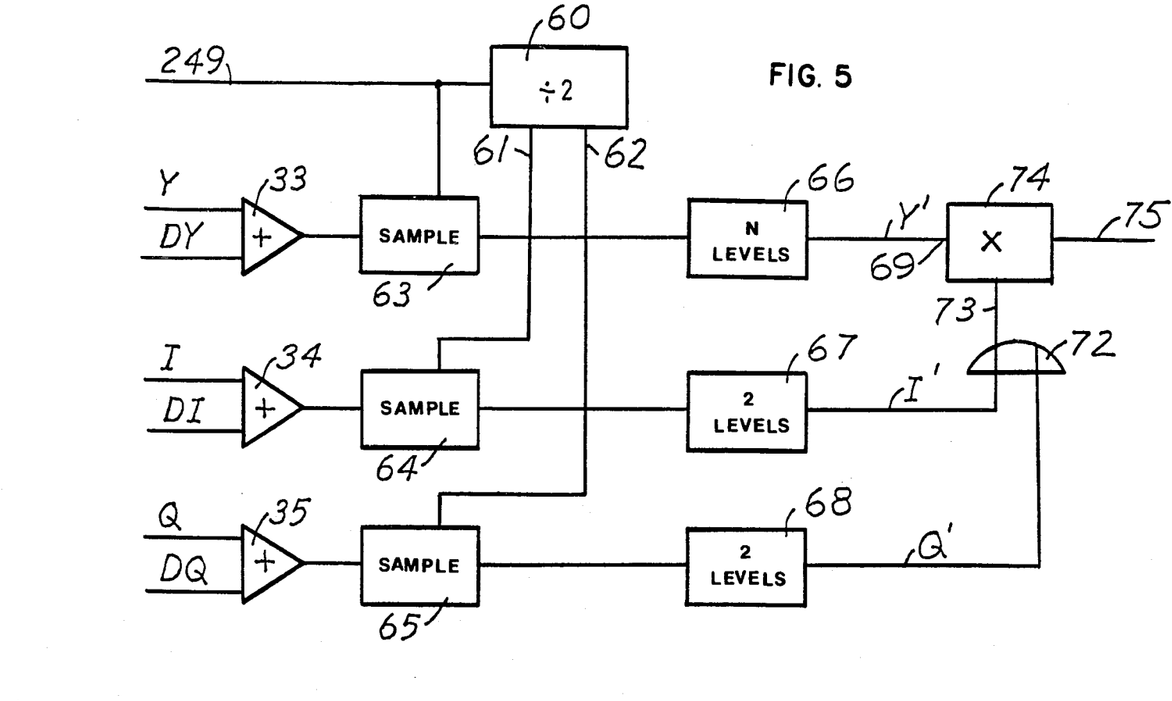
FIG. 5 shows a transmitter embodiment of the invention which transmits color pictures to a receiver by means of quantized positive and negative pulses.
Figure 6:
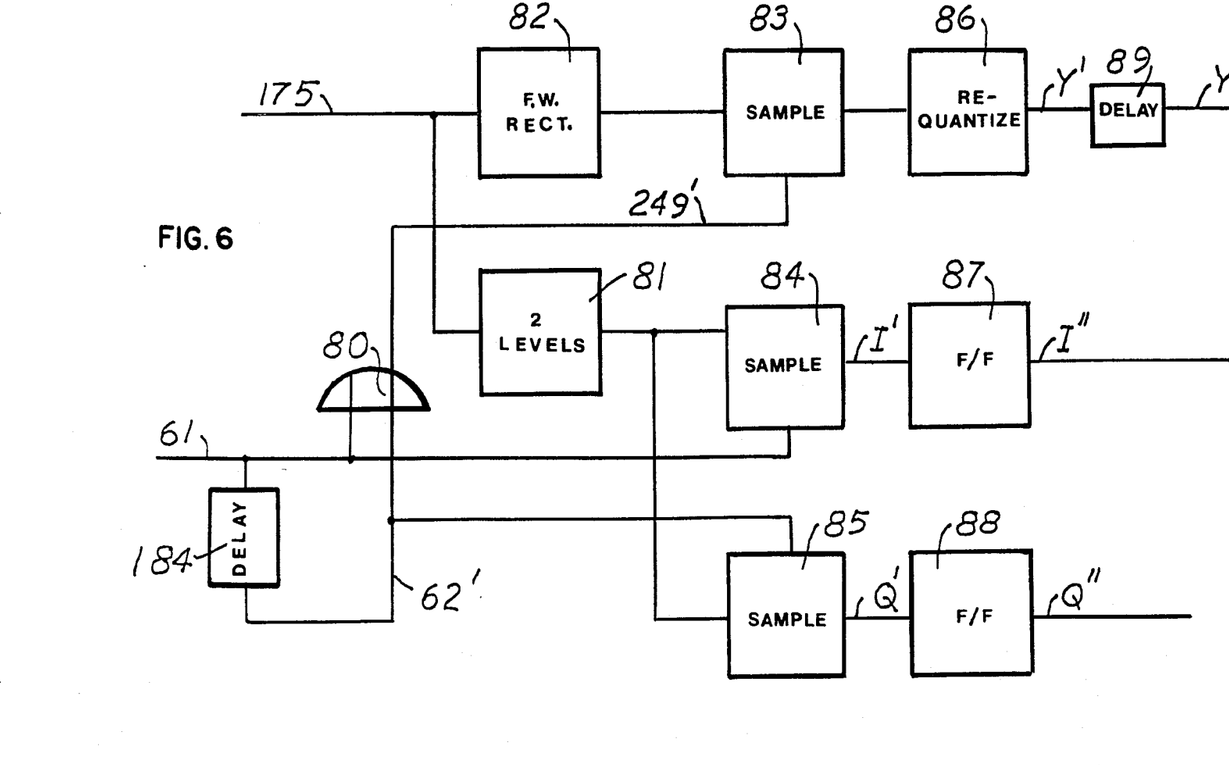
FIG. 6 is the corresponding receiver.

EMBODIMENTS OF FIGS. 5 AND 6

FIGS. 5 and 6 show yet another way in which my invention can be used. For the sake of increased clarity, the drawings show only, first, processing of previously described Y, I, Q, DY, DI, DQ signals and a clock signal to produce in the transmitter a composite signal 75 and, second, processing of the equivalent composite 175 in the receiver to recover Y", I" and Q" approximations of Y, I and Q and to display the corresponding television picture in the manner already described for other embodiments.

The Y, I and Q input video signals of FIG. 5 are the same as those of FIG. 3. Also the unit 44 shown in FIG. 3 generates DY, DI and DQ dither signals and furnishes a clock signal 249 of FIG. 5 which, in this instance, is at $8 \times 10^6$ p.p.s. (pulses per sec.). Although the same dither may optionally be employed in both I and Q channels, different DI and DQ will be assumed, for greater generality. A one-stage binary counter 60 divides the clock pulses 249 into one pulse stream 61 corresponding to odd-numbered clock pulses and another pulse stream 62 corresponding to even pulses. Both new pulse streams are, therefore, at $4 \times 10^6$ p.p.s., but displaced from each other. Summing unit 33 combines luminance signal Y with dither DY. The sum is then sampled in unit 63 in synchronism with clock pulses 249 and then quantized into N levels, by means of unit 66 which is similar to the quantizers of FIGS. 1 and 2. Typically, N is between 3 and 6 inclusive. Since Y has only one polarity, in accordance with the prior art, the dither coded output Y' will be taken to be always positive. Y' is presented to multiplier unit 74 on input 69.

Further in accordance with prior art, the chrominance component signals I and Q are bipolar; that is to say, they vary from positive to negative. I and DI are added in unit 34, sampled in unit 64 in synchronism with the odd pulses 61, and quantized into uniform positive or negative pulses I' in 2-level quantizer 67. Q and DQ are likewise added in summing unit 35, sampled in synchronism with even pulses 62, and quantized into uniform positive and negative pulses Q'. By means of OR circuit 72 of the prior art, the I' and Q' pulses are merged into a single stream (consisting of bipolar pulses at $8 \times 10^6$ p.p.s.) which goes to a second input 73 to the multiplier unit 74. The latter is any suitable device of the prior art, such as an analog multiplier or a switching arrangement for reversing the polarity of an amplifier output when the input on 73 changes sign.

It will now be clear to persons skilled in the art that the stream of output pulses 75 from multiplier unit 74 has been quantized into N positive and N negative levels (2N in all); that the magnitude of a pulse corresponds to Y' (the dither-coded representation of Y); and that the algebraic sign corresponds to either I' (the dither coded representation of I) or Q' (the dither-coded representation of Q), according to whether the pulse count is odd or even. Although not shown on FIG. 5, it will be abundantly clear to persons skilled in the art how sync signals can be transmitted from time to time intermittently, to insure that proper odd and even parity of the clock pulses can be determined in a receiver; and it will also be clear how the same sync signals can provide horizontal and vertical synchronization of raster scanning. However, when the combined signal 75 is recorded for later playback, I prefer to also record a timing track synchronized with one of the outputs of counter 60, say the odd output 61.

Figures 9A, 9F:
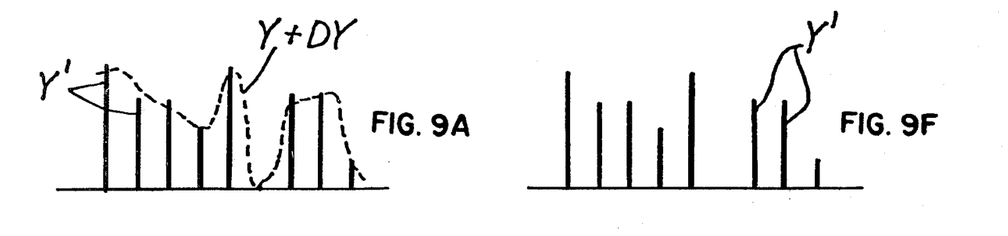
FIG. 9 shows certain ideal waveshapes associated with FIGS. 5 and 6.
Figures 9B, 9G:
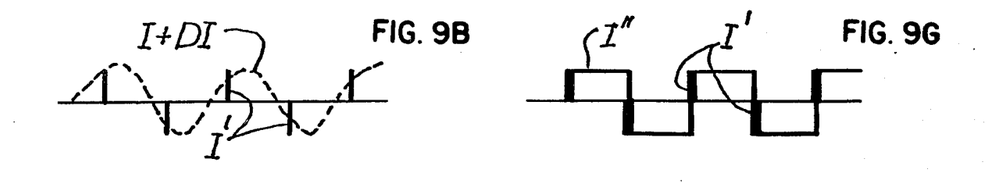
Figures 9C, 9H:
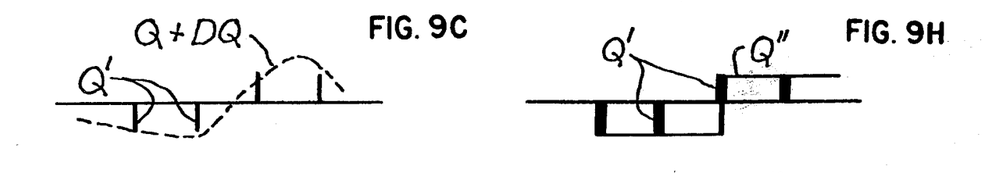
Figures 9D, 9I:
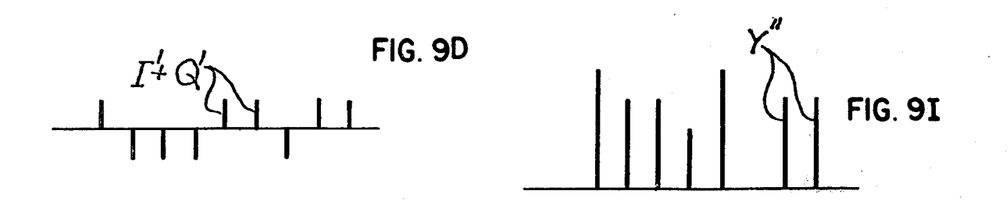
Figure 9E:
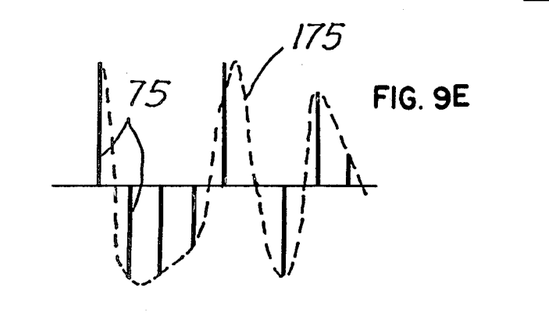

Referring now to FIGS. 9A–9I, the sum Y+DY is shown at FIG. 9A, along with the representation Y', which is seen to be sampled (at the rate of clock signal 249) and also quantized (five different levels shown). In FIG. 9B is shown I+DI and its representation I'. I' is synchronous with odd samples of Y' and quantized into uniform positive and negative pulses. Likewise, FIG. 9C shows Q+DQ; and Q', wherein the pulses are synchronized with even pulses of Y'. The merged I' and Q' pulses are shown in FIG. 9D and FIG. 9E we see the composite signal 75 having pulse amplitudes corresponding to those shown in FIG. 9A with the sign of each pulse corresponding to that shown in FIG. 9D. A transmission channel which has enough bandwidth for the original Y input, but not enough to define individual pulses, will deliver the envelope 175, shown dotted.

In the receiver of FIG. 6, it has been assumed that the odd clock pulses 61 are recovered from a record timing track at the same time that the composite signal 175 is reproduced from a record. Said pulses are delayed one-eighth microsecond in unit 184, as shown, to obtain a replica 62' of the even clock pulses. Combining 61 and 62' in OR circuit 80, we also obtain a replica 249' of the $8 \times 10^6$ p.p.s. clock pulses 249 of the transmitter. In some systems, where it may not be practicable to furnish the clock signal 61 at the receiver input, an accurate local clock oscillator may be phase-locked, in accordance with prior art, to the horizontal sync pulses (not shown in FIGS. 5 and 6); approximately 250 pulse oscillations occur in clock signal 61 during the interval between horizontal sync pulses. Other prior-art ways to obtain the three clock signals will also occur to persons skilled in the art.

Composite signal 175 is rectified in full-wave rectifier unit 82 and then sampled with clock signal 249' in sampler 83 to recover the Y' pulses. For best use of the invention, I prefer to also requantize Y' in unit 86 which has quantizing steps corresponding to unit 66 of FIG. 5. The Y' output is additionally shown in FIG. 9F. The bipolar composite signal 175 is also sampled in two samplers 84 and 85, preferably after positive and negative clipping in optional 2-level quantizer 81. Under control of the odd pulses 61, unit 84 sorts out the I' samples and flip-flop 87 stores the samples between sample periods. FIG. 9G shows the samples I' by heavy lines and I'', the continuous output of the flip-flop, by a lighter line. In the same manner, sampler 85, under control of clock 62', sorts out Q' pulses and flip-flop 88 puts out a continuous signal Q'', shown in FIG. 9H. Inasmuch as the centers of the I'' and Q'' output pulses are delayed by one-eighth microsecond relative to the I' and Q' samples, broadband delay unit 89 of FIG. 6 is preferably included to delay the Y' output a like amount; the delayed signal Y''' is shown at FIG. 9I.

The Y''', I'' and Q'' video signal components are converted into a displayed television picture by means of the prior art equipment shown as 103 in FIG. 4. Details of the conversion process, using the luminance and chrominance signals together with sync signals not shown in FIGS. 5 and 6, are well known to the art and have already been discussed herein.

Certain simplifications and economies can usually be effected in the practical implementation of the system shown schematically in FIGS. 5 and 6. For example, instead of using two quantizers, 67 and 68 and OR circuit 72, the odd and even chrominance samples from units 64 and 65 could be combined in a summing amplifier, so that a single quantizer would serve for both I' and Q'. Furthermore, if multiplier 74 is implemented by means of a polarity-controlled switching circuit, it may be feasible to omit the quantizer, or to merely compress the pulse amplitudes supplied to the input 73.

It will be clear to persons skilled in the art that the pulses of the composite signal 75 can also be coded in other ways without departing from the spirit of the invention. For example, it can easily be arranged that the I'+Q' pulses vary between zero and the (N+1) quantizer level, instead of either side of zero, and multiplying unit 74 can be replaced by a summing amplifier. The output pulses 75 will then have 2N+1 possible quantized values; values greater than N signify the same information as a positive pulse in FIG. 9(e) and values of N or less correspond to a negative pulse. In the former case, Y' corresponds to the difference between the pulse level and N+1, in the latter case, Y corresponds to N.

GENERATION OF THE ORDERED DITHER SIGNALS

Ordered dither suitable for this invention has been described in the literature and also in my U.S. Pat. No. 3,739,082. An ordered dither signal is a repetitive sequence of pulses having various specified amplitudes, corresponding to a horizontally and vertically repeated pattern of dither samples in relation to the television scanning raster. The distribution of pulse amplitudes is preferably adjusted so that the peak-to-peak deviation is slightly less than the interval between quantizer steps (assumed to be the same for all steps); however, with a 2-level quantizer, the range of values is sometimes made more or less, to vary the contrast.

One technique for generating an ordered dither signal is by digital-to-analog conversion of a suitable sequence of binary numbers obtained by logical combination of binary signals (square wave oscillations) derived from the raster-scanning circuitry of the transmitter. This method will presently be shown by example. Other equivalent methods include readout from storage, in synchronism with the scanning, and the like.

Figure 7:
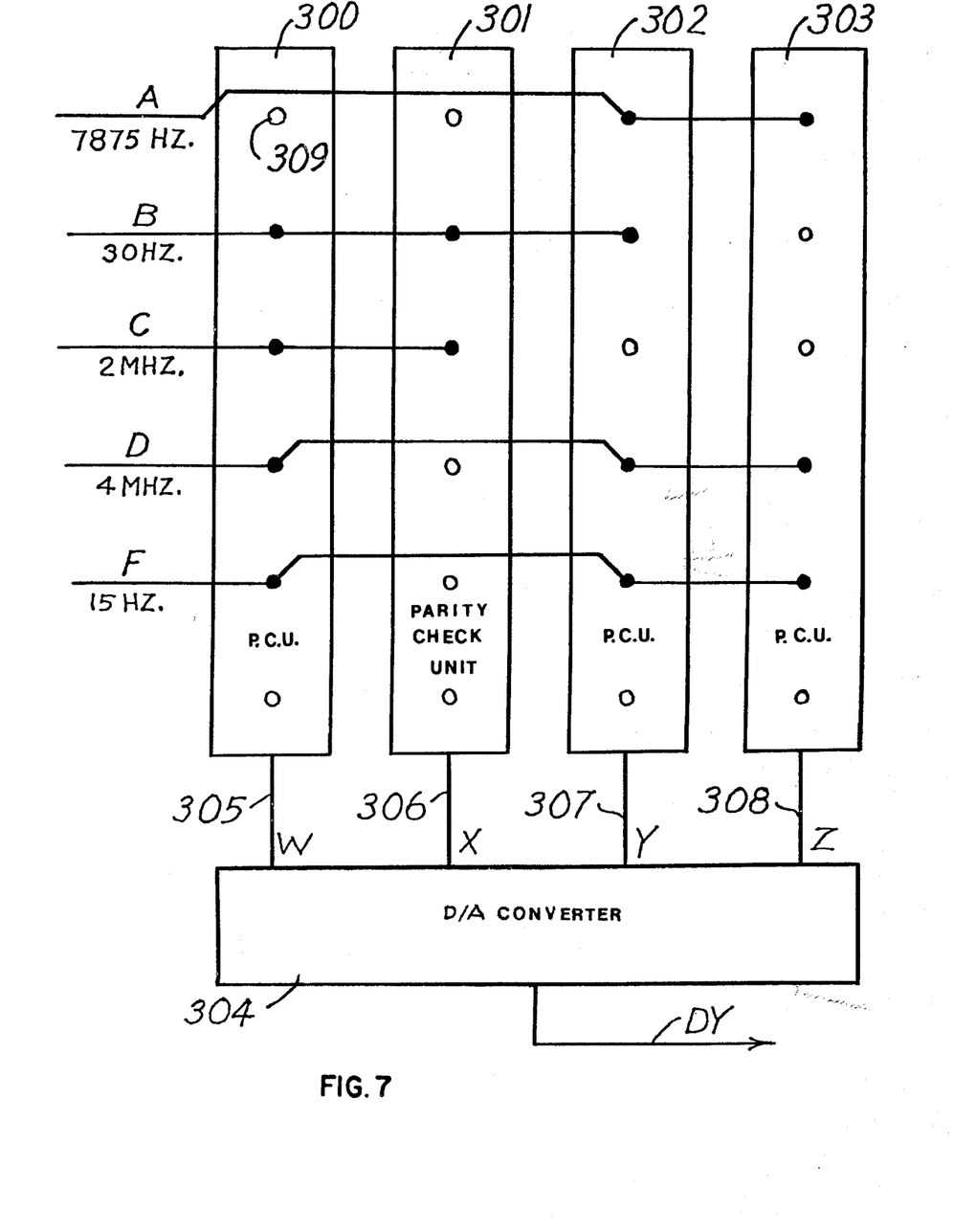
FIG. 7 depicts one example of an ordered dither generator of the prior art suitable for use in my invention.

Although not essential for the invention, I prefer 3-dimensional nasik dither of the referenced patent. FIG. 7 shows a practical arrangement for generating only the DY dither signal of FIGS. 3 and 5 and DI and DQ will be discussed later. The arrangement of FIG. 7 follows the teaching of the prior patent put particular logic has been worked out to utilize the odd number of scanning lines and interlaced scanning of the NTSC system, and also to make use of convenient hardware devices.

Units 300 through 303 inclusive are identical parity-check units of the prior art, similar to commercially available units. Each such unit has a number of inputs 309 whereby binary information can be inserted (six inputs per unit shown on the drawing). One specified signal level corresponds to a 1, and another specified level to a 0, following the conventional art. A square-wave signal which alternates between appropriate amplitude values therefore corresponds to alternate 0's and 1's. It is characteristic of the parity check units 300–303 that the output of unit 300, for example, is 1 when an odd number of 1's is present on the six inputs and 0 when the an even number is present. (An input to which no connection is made is considered to receive 0.)

The NTSC scanning raster has 525 lines with 2:1 interlace, horizontal scanning frequency of 15750 Hz. and frame rate of 30 frames (60 fields) per sec. Also, we have consistently assumed a luminance sampling rate of $8 \times 10^6$ pels/sec. In synchronism with the horizontal scanning, we therefore provide a square-wave signal, designated A, having frequency of 7875 Hz. (half the scan frequency) and connect A to inputs of units 302 and 303, as shown. From the 60 Hz. vertical sweep, we derive square waves B and F. B is 30 Hz. and is connected to inputs of 300, 301 and 302, while F is 15 Hz. and connected to 300, 302 and 303, as shown. From the clock are derived a 4 MHz. signal D, which goes to 300, 302 and 303 and a 2 Mhz. signal C, which goes to 300 and 301. The relative phase relationships between various square waves is not important.

It will be apparent that four binary outputs (W,X,Y and Z of the drawing) change continually as the several inputs change. The continually-changing binary number WXYZ is therefore decoded in digital-to-analog converter 304 to obtain dither signal DY. In this example, DY has 16 possible amplitudes, which preferably are adjusted for equal positive and negative peaks, and a peak-to-peak difference of 15/16 quantizer step. It will be seen that Z could be omitted, resulting in only eight amplitudes; in such case the optimum peak-to-peak value of 7/8 step. Other 2- and 3-dimensional nasik patterns having 16 steps, as well as non-nasik ordered dither patterns can be obtained by suitably altering the connections to parity-check units. For generating more than 16 amplitudes (rarely advisable), it is necessary to have more output variables. For 32 amplitudes, a suggested fifth variable is obtainable by dividing both the input signal C and the output signal Z by two, and then taking the EXCLUSIVE-OR sum.

Inasmuch as the eye is much less sensitive to chromaticity differences than to luminance variations, DI or DQ does not need as many amplitude values as DY. I may therefore use only the variables W, X and Y, or even only W and X. Also, odd-even sampling means that only alternate pels of a chrominance component are sampled along the horizontal scan line while full vertical resolution is maintained. I therefore prefer to stretch the dither pattern horizontally by a factor of two. This is done by halving the frequencies of the C and D square waves of FIG. 7. To make DQ different from DI, I employ a second digital-to-analog converter in parallel and negate one of the binary inputs to said second converter only.

COMPARISONS

Persons skilled in the art will readily perceive the following relations between the three different invention embodiments described hereinabove:

(1) The embodiment of FIGS. 1 and 2 transmits N electrical amplitudes to represent a signal, say the luminance Y, which is dither-quantized with N levels. Consequently, the conventional NTSC subchannel can be utilized to send a luminance or chrominance component, regardless of the value of N. More bandwidth is needed to send the NTSC composite signal than would be required for Y alone.

(2) In the embodiment of FIGS. 3 and 4, N-level samples are binary coded in terms of only two electrical amplitudes, similar to pulse-code-modulation. Subchannel bandwidth must therefore be increased in proportion to the binary word length. For example, since two bits/sample are sent when N=4, twice the analog bandwidth is required. The multiplexed color signal (a composite signal) requires more bandwidth than would be needed for only binary-coded Y.

(3) The embodiment of FIGS. 5 and 6, by transmitting more than N electrical amplitudes when Y is quantized with N levels, squeezes all three color components into a transmission channel having only the Y-signal bandwidth.

(4) Inasmuch as all embodiments of the invention transmit a dither-quantized video component, persons skilled in the art will perceive that the picture presented on display unit 21 includes at least one stippled image component. This results in a pointillistic display (i.e. one in which patches of different color are intermixed to give the subjective effect of intermediate colors or shades) and 3-dimensional dithers that reduce the visibility of stipple on a black-and-white television picture also reduce the visibility of pointillistic patches by producing at each pel the subjective effect of intermediate colors. It will be apparent that pointillism of the invention is introduced at the transmitter.

I claim:

1. Dither quantized signalling apparatus comprising:
    means for converting a colored input picture into plural component pictures;
    means for representing said component pictures by a plurality of video signals, the amplitude of each signal varying substantially in proportion to component intensity in successive picture elements arranged in a predetermined scanning sequence;
    means for combining one of said video signals with dither to obtain a first resultant signal;
    means for approximating with plural quantizing levels separate successive samples of the first resultant signal;
    means for combining another video signal with dither to obtain another resultant signal;
    means for approximating with two quantizing levels samples of said another resultant signal; and
    means for generating and transmitting quantized composite samples wherein the amplitude of a composite sample corresponds to an approximated sample of the first resultant signal and its polarity about a selected reference level represents an approximated sample of said another resultant signal.

2. Signalling apparatus for color television comprising:
    means for converting a color picture into a plurality of component video signals including a chrominance signal;
    means for generating dither;
    means for combining said chrominance signal and said dither to obtain a resulting dithered chrominance signal;
    means for quantizing said resulting dithered chrominance signal according to two quantizing levels; and
    means for encoding said plurality of component video signals into a composite signal, at least said chrominance signal being first combined with dither and quantized with discrete quantizing levels.

3. Apparatus for transmitting luminance and chrominance components sufficient for a colored television picture, said apparatus comprising:
    means for scanning a picture according to a predetermined scanning path and for generating a set of video signals including a luminance signal substantially the analog of luminance along said scanning path and a chrominance signal substantially the analog of chrominance along said scanning path;

means for obtaining a dither signal:

means for combining said chrominance signal with with said dither signal and for quantizing with two levels the amplitude of the combined signal to produce a dither-quantized chrominance signal;

means for incorporating signals, including said dither-quantized chrominance signal, into a composite signal; and means for transmitting said composite signal.

4. Television transmitting apparatus according to claim 3 transmitting a colored television picture which is reproducible by conventional television receiver means.

5. Transmitting apparatus according to claim 3 including:

means for producing a dither-quantized analog signal representing the luminance signal;

means for producing at least one dither-quantized analog signal representing a like number of chrominance signals; and means for incorporating said dither-quantized signals into the transmitted composite signal.

6. Apparatus according to claim 3 or claim 4 arranged to transmit a composite signal which includes a luminance signal represented with more than two amplitude levels and a chrominance signal represented with only two amplitude levels.

7. Television transmitting apparatus according to claim 6;

wherein said composite signal and said means for incorporating provide for said dither-quantized luminance signal a subchannel sufficient for transmission of an analog signal having W Hz. bandwidth but insufficient for one having 2 W Hz. bandwidth; and wherein said dither-quantized luminance signal is transmitted with at least W Hz. bandwidth regardless of the number of quantizing levels.

8. Transmitting apparatus according to claim 3 wherein said dither signal corresponds to three-dimensional dither.

9. The transmitting apparatus of claim 3 wherein said dither signal corresponds to three-dimensional nasik dither.

10. The transmitter of claim 3 including:

means for generating a stream of sampling pulses;

means for combining a video signal with dither, for sampling the combined signal in synchronism with said sampling pulses, and for quantizing the resultant samples to obtain a stream of samples sufficient for dither-quantized representation of said video signal; and means for incorporating into the transmitted composite signal television information represented by said stream of quantized samples.

11. The television transmitter of claim 10 wherein the said sampling pulses have fixed frequency relation and fixed phase relation to amplitude changes in the dither signal associated with said dither-quantized video signal.

12. The television transmitter of claim 10 arranged to dither-quantize with four or more levels a luminance signal having W Hz. bandwidth and to transmit the information pertaining thereto by means of samples occuring at less than 4 W samples per second rate.

13. Video recording means recording a composite television signal. including:

the transmitter of claim 10;

means for recording the transmitted composite signal on a record medium; and means for recording a clock signal on the same record medium, said clock signal sufficient for accurate reproduction of said stream of sampling pulses in associated reproducing equipment.

14. The video recording means of claim 13 wherein the record medium conforms to a figure of revolution;

said transmitted composite signal is recorded on a track playable for a certain length of time; and said clock signal is recorded on a circular track arranged to be played repeatedly during said certain length of time.

15. A video record on a figure of revolution having a clocking signal recorded thereon and produced according to claim 14.

16. A video record having recorded thereon a composite signal and a clocking signal produced by means corresponding to claim 13.

17. A color television system comprising:

the transmitter of claim 10;

receiver means for decomposing the transmitted composite signal into separate component signals including a chrominance signal corresponding to said stream of 2-level samples of the transmitter;

resampling and 2-level requantizing means operative on said chrominance signal to substantially regenerate the aforesaid stream of samples; and means for displaying in color a television picture corresponding to received video information including information residing in the stream of regenerated samples.

18. A color television system comprising:

the transmitting apparatus of claim 3;

receiver means for decomposing the transmitted composite signal into a set of video signals including said dither-quantized chrominance signal;

means for requantizing the amplitudes of the received dither-quantized chrominance signal with two quantizing levels; and means for displaying a television picture in color corresponding to information in the set of video signals including the chrominance signal with requantized amplitudes.

19. The transmitter of claim 10 wherein samples of a dither-quantized multi-level luminance signal correspond to pulse-amplitude-modulation samples with amplitudes restricted to discrete quantum values.

20. A recording process for producing a color-television record, said process comprising:

generating and transmitting a composite signal by means of the apparatus of claim 3;

transmitting said composite signal to recording means; and recording on a record medium information including said composite signal.

21. Dither quantized signalling apparatus comprising:

means for converting a colored input picture into plural component pictures;

means for representing said component pictures by a plurality of video signals, the amplitude of each signal varying as the analog of component intensity in successive picture elements arranged in predetermined scanning sequence;

means for combining one of said video signals with dither to obtain a first resultant signal;

means for approximating with plural quantizing levels separate, successive samples of the first resultant signal;

means for combining another video signal with dither to obtain a second resultant signal;

means for approximating with two quantizing levels samples of said second resultant signal; and means for generating and transmitting quantized composite samples wherein the amplitude of a sample is sufficient to define an approximating sample of said first resultant signal, and wherein the amplitude of said samples also falls into either of two amplitude ranges and the range is sufficient to define an approximating sample of said second resultant signal.

22. A recording process for producing a color-television record, said process comprising:

generating quantized composite samples by means of the dither-quantized signalling apparatus of claim 21; and recording on a record medium information including said quantized composite samples.

23. Television receiving apparatus displaying a colored television picture corresponding to a received composite signal;

said composite signal incorporating a chrominance signal quantized with two levels;

said receiving apparatus comprising:

means for decomposing said composite signal into a set of video signals including said quantized chrominance signal;

means for requantizing with two levels the amplitudes of said chrominance signal; and means for displaying a colored television picture corresponding to information in a set of video signals including the signal wherein amplitudes have been requantized.

24. Apparatus for receiving and displaying a television picture according to claim 23, comprising:

means for decomposing a received composite signal into separate component signals, including a particular signal corresponding to a stream of quantized samples in the transmitter;

resampling and requantizing means operative on said particular signal for substantially regenerating the aforesaid stream of quantized samples; and means for displaying a colored television picture corresponding to information received from said composite signal, including information residing in said regenerated stream of quantized samples.

25. Playback equipment for displaying the television picture recorded on a video record compatible therewith, comprising:

means for reproducing a recorded clock signal and for producing therefrom a stream of sampling pulses;

means for reproducing a recorded composite signal and for decomposing the same into a set of component video signals including a chrominance signal dither-quantized with two levels;

means for regenerating said two-level chrominance signal by sampling according to said sampling pulses and by requantizing according to two quantum levels; and means for displaying a colored television picture corresponding to the set of component signals with at least said dither-quantized chrominance signal regenerated.

26. Television apparatus transmitting a pointillistically colored television picture, said apparatus including:

means for obtaining a set of video signals corresponding to successively scanned elements of the television picture, said set including a pair of chrominance signals, one thereof varying according to one vector component of the chromaticity of said successively scanned elements, the other varying according to another vector component of said chromaticity;

means for combining each said chrominance signal with dither;

means for quantizing according to two quantizing levels each combination of a chrominance signal with dither, whereby the chromaticity of a once-scanned element is quantized according to only four chromaticity values; and means for transmitting the set of video signals with at least said pair of chrominance signals in dither-quantized form.

27. The apparatus of claim 26 transmitting a sequence of television frames suitable for display of a moving picture scene on a television receiver; said apparatus comprising;

means, including dither-quantizing means, for representing details of one frame of the picture by differently colored patches intermixed in one pointillistic arrangement, and for representing corresponding picture details of another frame of the same picture scene by colored patches intermixed in another pointillistic arrangement, regardless of whether the pictured details have remained stationary and unchanged.

28. The transmitting apparatus of claim 21 wherein said chrominance signals is quantized with 3-dimensional dither.

29. The apparatus of claim 26 transmitting a set of video signals that includes a dither-quantized luminance signal.

30. The apparatus of claim 26 transmitting said set of video signals by means of a composite signal.

31. The transmitting apparatus of claim 29 including analog-to-digital conversion means and transmitting said set of video signals in digital form.

32. A system for producing a video record, comprising the transmitting apparatus of claim 31 or claim 30 and means for recording the transmitted set of video signals.

33. A television system comprising the transmitting apparatus of claim 31 and receiving apparatus, said receiving apparatus including digital-to-analog conversion means for video signals received in digital form.

34. A recording process for producing a color-television record, said process comprising:

generating and transmitting component video signals in digital form by means of the apparatus of claim 31;

transmitting said signals to recording means; and recording on a record medium information including said signals.

35. A television system comprising the transmitting apparatus of claim 26 and compatible receiving apparatus.

36. A television system according to claim 35 including in the receiving apparatus means for resampling and requantizing a dither-quantized video signal.

37. A television system corresponding to the system of claim 35 including conventional television receiving apparatus of the prior art.

38. A video record storing on a record medium television information corresponding to a pointillistically colored image for a frame of a television picture, said information comprising a pair of chrominance signals each dither-quantized according to two discrete levels.

39. The video record of claim 38 storing video information corresponding to a color television scene and comprising a sequence of frames;

information of one said frame corresponding to a picture colored pointillistically such that a uniformly colored picture area is depicted by means of a patchwork comprising a pattern of differently colored patches;

information of another frame corresponding to the same picture colored pointillistically so that the aforementioned area is depicted by a patchwork arranged according to another pattern of colors;

said patterns and said patchworks depicting said area being such that the mean colors, averaged over a continuous sequence of frames, approach one color at all scanned picture elements within said depicted area.

40. A recording process for producing a color-television record, said process comprising:

generating a set of video signals sufficient for color television, including therein a chrominance signal;

modifying the set of signals, at least by dither-quantizing said chrominance signal according to two levels;

recording on a record medium information sufficient for reproduction of the modified set of signals.

41. A video record storing color-television information on a medium, said record produced by means including the recording process of claim 40.

42. The record of claim 41 arranged so that it may be rotated for reproduction of said color-television information and also having a circular clocking track recorded thereon.

43. Use of the record of claim 42 in a system that reproduces a signal corresponding to information recorded on said record and samples said signal in accordance with a clock signal derived from the circular clocking track.

44. Use of the record of claim 41 in a system that reproduces signals corresponding to to the information recorded thereon.

45. Use of the record of claim 41 in a system that reproduces and requantizes a component signal corresponding to information recorded thereon.

* * * * *